(12) United States Patent
Pywell

(10) Patent No.: US 6,824,164 B2
(45) Date of Patent: Nov. 30, 2004

(54) VEHICLE ROOF LINER FOR OCCUPANT PROTECTION

(75) Inventor: James Frederick Pywell, Shelby Township, Macomb County, MI (US)

(73) Assignee: General Motors Corporation, Detroit, MI (US)

( * ) Notice: Subject to any disclaimer, the term of this patent is extended or adjusted under 35 U.S.C. 154(b) by 34 days.

(21) Appl. No.: 10/041,381

(22) Filed: Jan. 8, 2002

(65) Prior Publication Data

US 2003/0127842 A1 Jul. 10, 2003

(51) Int. Cl.[7] ............................................. B60R 21/22
(52) U.S. Cl. .................................. 280/730.2; 280/753
(58) Field of Search ......................... 280/730.1, 730.2, 280/748, 749, 728.1, 753

(56) References Cited

U.S. PATENT DOCUMENTS

| | | | | |
|---|---|---|---|---|
| 5,462,308 A | * | 10/1995 | Seki et al. ................... | 280/749 |
| 5,660,414 A | * | 8/1997 | Karlow et al. ............... | 280/749 |
| 5,707,075 A | * | 1/1998 | Kraft et al. ............... | 280/730.2 |
| 5,857,701 A | * | 1/1999 | Nanda ......................... | 280/749 |
| 5,957,493 A | * | 9/1999 | Larsen et al. ............ | 280/743.1 |
| 5,975,566 A | * | 11/1999 | Bocker et al. ........... | 280/730.2 |
| 6,000,715 A | * | 12/1999 | Tschaeschke ............ | 280/730.2 |
| 6,168,194 B1 | * | 1/2001 | Cuevas et al. ........... | 280/730.2 |
| 6,231,072 B1 | | 5/2001 | Pywell et al. ............ | 280/730.2 |
| 6,237,943 B1 | * | 5/2001 | Brown et al. ............ | 280/730.2 |
| 6,402,191 B1 | * | 6/2002 | Sinnhuber ................... | 280/729 |
| 6,428,038 B1 | * | 8/2002 | Baumann et al. ........ | 280/730.2 |

FOREIGN PATENT DOCUMENTS

DE    WO 99/59845    * 11/1999    .................. 280/729

* cited by examiner

*Primary Examiner*—Faye M. Fleming
(74) *Attorney, Agent, or Firm*—Laura C. Hargitt

(57) ABSTRACT

A roof liner assembly for cushioning vehicle occupants is disclosed. A folded fabric liner is anchored at one edge to the inside of the vehicle roof above the occupants' heads and stored above the passenger compartment head liner. Extendible means, such as a piston/cylinder, is stored in a body pillar and connected through a cable to the liner. The extendible means is activated to draw the stored liner over the head and shoulders of an occupant(s) in the event of a vehicle rollover or side impact collision.

19 Claims, 6 Drawing Sheets

_US 6,824,164 B2_

VEHICLE ROOF LINER FOR OCCUPANT PROTECTION

TECHNICAL FIELD

This invention pertains to occupant protection devices for automobile vehicle bodies. More specifically this invention pertains to a folded fabric liner that is stored against the vehicle roof and is pulled down around vehicle occupants upon a substantial vehicle side impact or a vehicle rollover.

BACKGROUND OF THE INVENTION

The passenger compartment of the modern automobile includes many devices that are provided for the safety of the driver and passengers. In general, the devices are designed to restrain vehicle occupants when the vehicle experiences a sudden and rapid deceleration due to a collision or the like. Seat belts restrain an occupant especially during a deceleration due to a front-end collision. Properly engaged seat belts provide passive protection, i.e., they do not require activation by a vehicle collision detection system. Air bags stored in the steering wheel and instrument panel provide additional protection to front seat occupants in such emergencies. These inflatable restraints remain folded in their storage position until an inflation charge is activated. The inflation charge is usually activated by a signal from a suitably located accelerometer that senses the emergency. Air bags stored in a vehicle door or in a body pillar perform a like function in the event of side impacts that might result in penetration of the occupant space.

There remains a need for protection against side impacts to the vehicle that can cause the vehicle to roll over or that otherwise cause an occupant to be displaced toward a side of the vehicle body. It is an object of this invention to provide a vehicle passenger compartment construction that can be activated to cushion the driver and passengers in such a side impact or rollover condition.

SUMMARY OF THE INVENTION

A vehicle may experience a driving maneuver or a side impact that causes it to roll on its side. This sudden, often high-speed sideways or lateral motion of the vehicle can abruptly thrust an occupant against the side or door of the passenger compartment. This invention provides a strong pliable cushioning liner that is anchored to the vehicle roof and stored there during normal vehicle operation. If the vehicle experiences a severe rolling motion, the stored liner is pulled around the head and shoulders of an underlying occupant to prevent that person from contacting the side of the vehicle.

Automotive vehicle bodies have a roof that is generally rectangular and defines the top of the passenger compartment. The roof is normally supported by two front body pillars and two rear pillars as well as two side pillars against which the front doors latch. These particular body features are utilized in the practice of this invention.

The interior of the passenger compartment defined by the vehicle body contains front seating for a driver and at least one passenger. The passenger compartment of most vehicles also contains rear seating. The fore-aft direction of the body has a central axis. Occupants seated to the left of that axis usually enter and exit by a left side door and right side passengers use a right side door. Considering the problems to be managed by this invention, should the vehicle roll to the left, the left side occupants may contact the left side, and vice versa, should the vehicle roll to the other side. This invention provides a fabric liner that is attached to and stored against at least one side of the roof. Preferably, such a liner is used on both sides of the passenger compartment.

One edge of the liner sheet is anchored to the inside of the vehicle roof. Preferably, the sheet is anchored along a fore-aft line above the heads of the front and rear passengers. The sheet is folded for storage above the roof liner of the passenger compartment. The shape of the liner is such that it can be drawn toward the adjacent side of the passenger compartment if the vehicle rolls. In a preferred embodiment, the liner is pulled over the heads and shoulders of occupants seated in the front and rear on that side of the vehicle. Left side occupants are thus cushioned by a liner drawn to the left side. Likewise, right side occupants are protected by a liner drawn to their side.

In a preferred embodiment, the fabric liner is generally trapezoidal in shape. It is folded for storage within the area of the roof but when pulled and unfolded it extends fore and aft over both front and rear seat passengers on one side of the passenger compartment. The shorter base side is attached to the vehicle roof. In the folded and stored position of the liner, the longer base side lies near the adjacent side of the compartment and the liner is hidden from view by the headliner that decorates the interior roof of the compartment. The liner is drawn from its stored position by a cylinder/piston mechanism and cable/pulley mechanism that are activated by a vehicle crash mode requiring occupant protection.

In a first embodiment, a piston/cylinder mechanism is located in the middle pillar of the vehicle. Two cables are attached to the piston rod. One cable runs up the pillar to the roof and over pulleys that lead the cable to the front corner of the liner. The second cable is similarly led to the rear corner of the liner. The piston rod is rapidly stroked one time in the cylinder by a high pressure, gas generating charge activated by an accelerometer of other suitable sensor of a rollover condition. The rod quickly pulls the cables and, thus, unfolds the liner and draws it laterally and downwardly over the heads and torsos of the occupants.

Depending upon the design of the passenger compartment it may be preferred to draw the liner from a position other than the middle pillar. Accordingly, in other embodiments, cylinder/piston rod mechanisms are located in one or both of the front and rear pillars and are activated in a like manner to draw the liner to its occupant protecting position.

Other objects and advantages of the invention will become apparent from a detailed description of preferred embodiments.

DESCRIPTION OF PREFERRED EMBODIMENTS

Three embodiments of the vehicle body/roof liner/liner drawing mechanism combination will be described. Each is intended for occupant protection in vehicle side impacts and rollover situations. The first embodiment will be described with reference to FIGS. 1–8 of the drawings.

Figure 1:
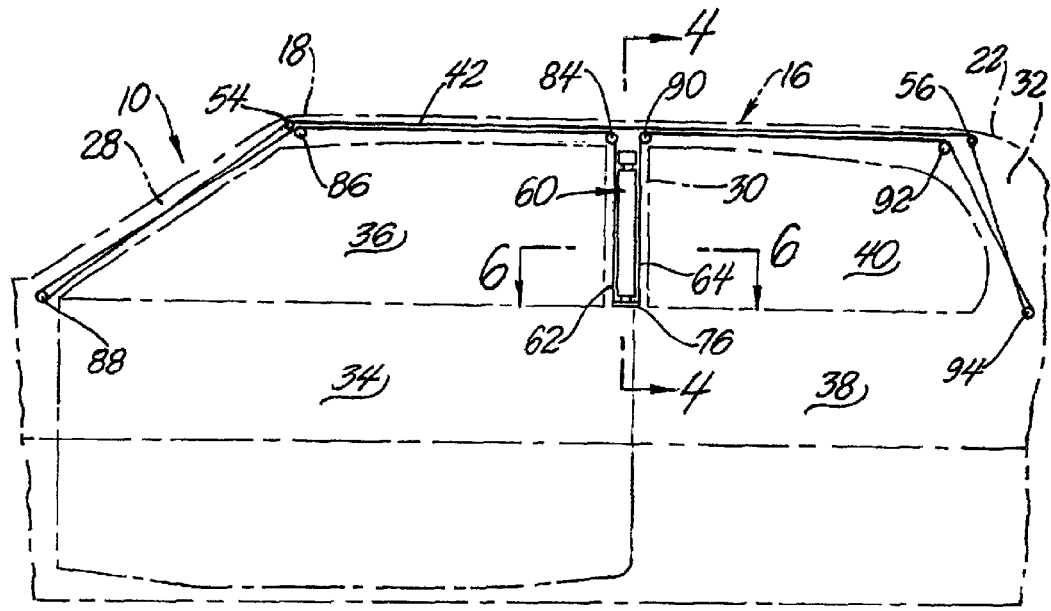
FIG. 1 is a side view in phantom lines of the passenger compartment portion of a vehicle body schematically showing the position of a sheet pulling piston/cylinder and associated cable system in a first embodiment for pulling a liner assembly from its stored position.
Figure 2:
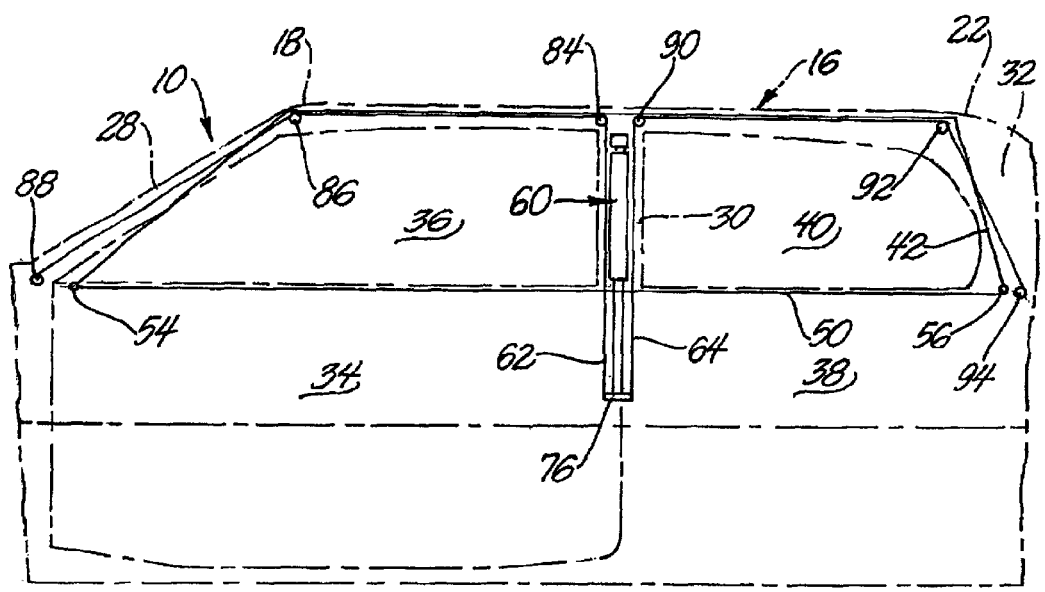
FIG. 2 is a side view like FIG. 1 showing a roof liner in its extended and operative position as well as the piston/cylinder and cable system in the liner operative position.
Figure 3:
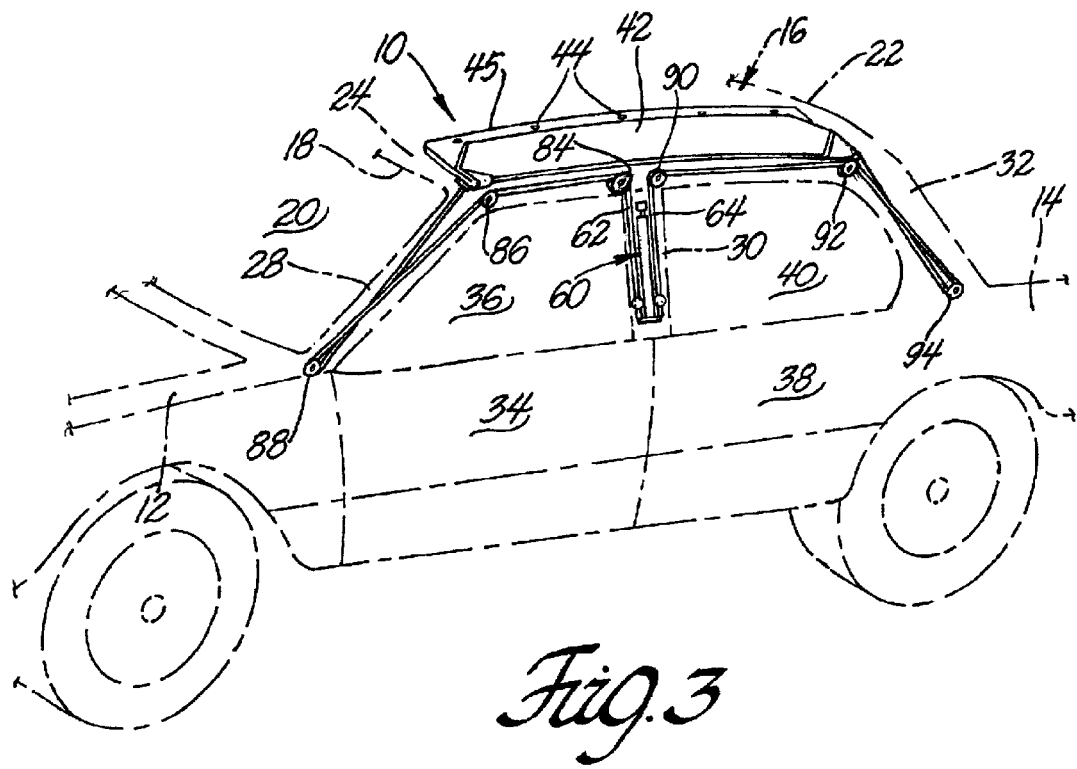
FIG. 3 is a perspective phantom view of a vehicle body, showing in perspective a left side, folded and stored roof liner and piston/cylinder and cable system.
Figure 4:
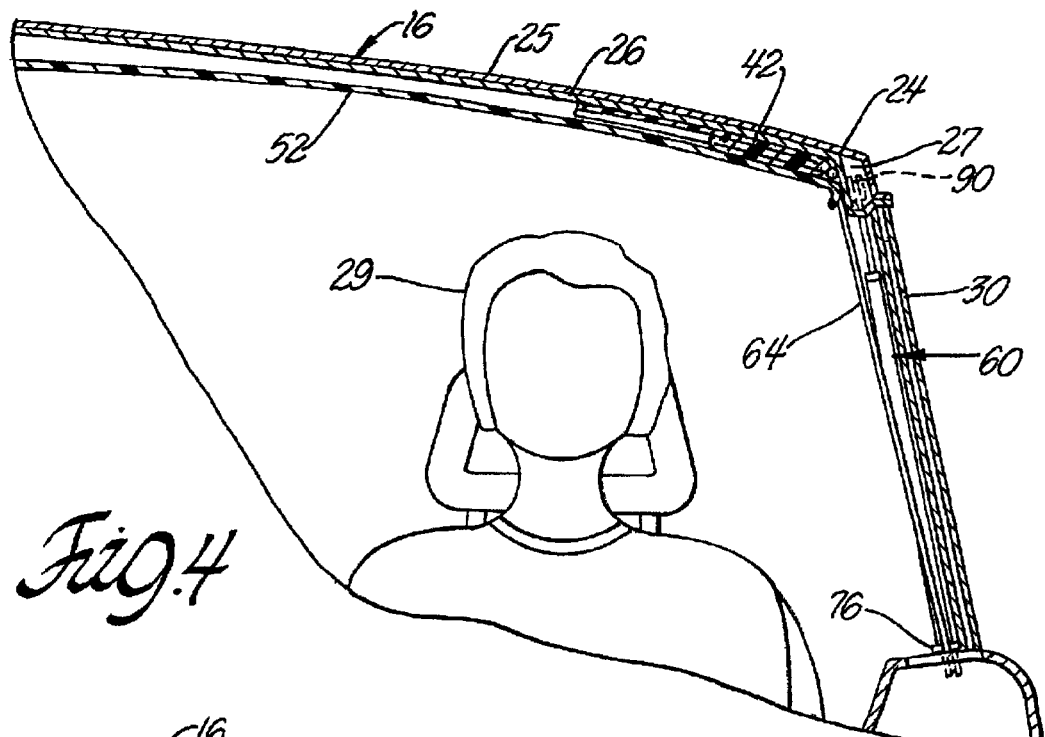
FIG. 4 is a sectional view of the left side of the vehicle body and stored roof liner assembly of FIG. 1 taken in direction 4—4 of that figure.
Figure 5:
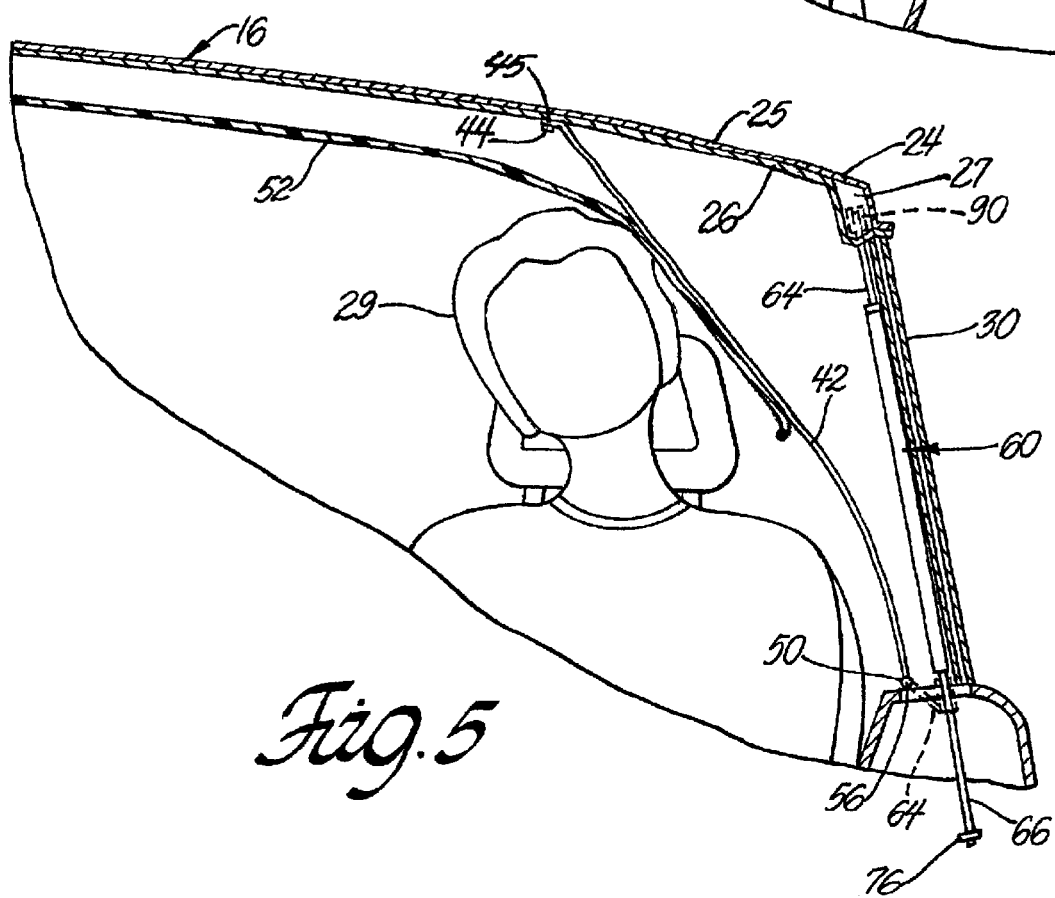
FIG. 5 is a sectional view like that of FIG. 4 showing the roof liner assembly in its unfolded, extended and activated position.
Figure 6:
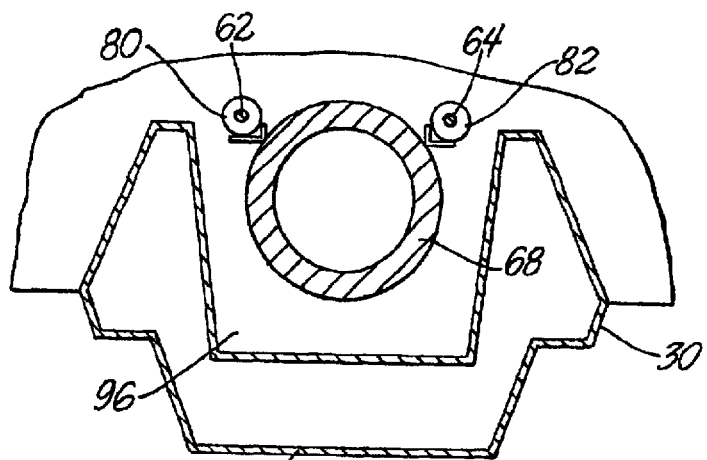
FIG. 6 is a sectional view of the left middle pillar of the car body of FIG. 1 and the sheet pulling piston and cylinder of the roof liner assembly taken in direction 6—6 of that figure.

In FIGS. 1–3 a portion of an automotive vehicle body 10 is shown in phantom outline. In FIG. 3 the engine compartment 12 and the trunk compartment 14 are shown only sketchily. Referring further to FIG. 3 the vehicle body comprises a roof 16 (only the left side shown and in phantom lines) that is generally rectangular in configuration. The roof has a front edge 18 at the vehicle windshield 20. Roof 16 also has a rear edge 22 and, as perceived looking toward the front of the vehicle, a right side (not shown) and a left side 24. Roof 16 may be formed of outer 25 and inner 26 stamped sheets of metal such as steel or aluminum as illustrated in FIGS. 4 and 5. Outer sheet 25 and inner sheet 26 are generally complementary in shape except at side 24 where they form a front to rear channel 27.

The vehicle roof 16 is usually supported on each side by three pillars. The left side pillars are illustrated in FIGS. 1, 2 and 3. There is a forward pillar 28, a middle pillar 30 and a rear pillar 32. In the terminology of the automotive body engineer the front pillar is called the A-pillar, and the middle and rear pillars, the B- and C-pillars respectively. Not shown are the corresponding pillars on the right side of the vehicle.

The vehicle passenger compartment has a left side door 34 and front window 36. The vehicle depicted in these drawing figures has only two doors, left side 34 and right side, not shown. The outer left rear portion of the occupant compartment of the body is enclosed by a quarter panel 38 and rear window 40. Most vehicles have front seating for a driver and at least one passenger and rear seating for additional passengers. Front seats would be aligned with the front door 34 and the rear seat with rear window 40. An object of this invention is to prevent vehicle occupants from contacting the vehicle interior, or from being ejected from the vehicle.

Figure 11:
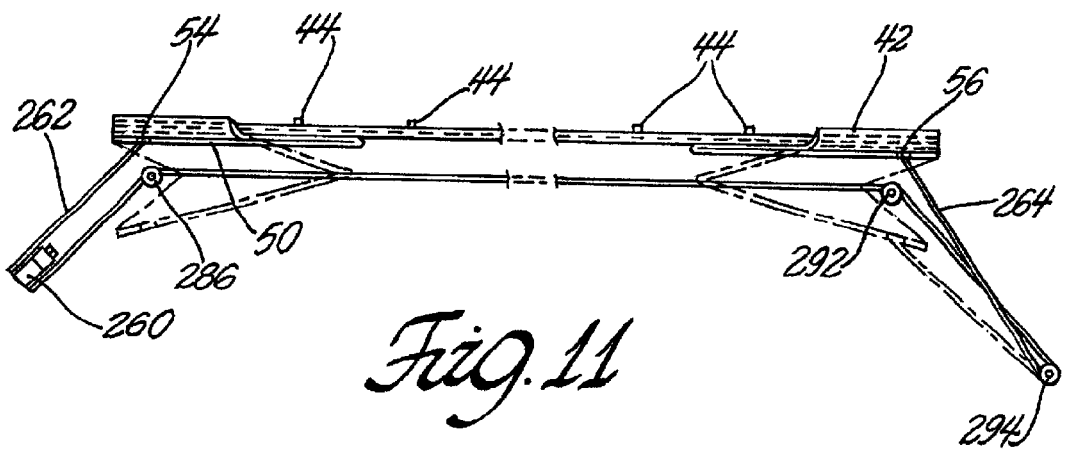
FIG. 11 is a view of an isolated cylinder and pulley system for unfolding and extending the roof liner in a second embodiment of this invention.

Roof 16 has a generally central fore-aft axis that is not specifically shown in FIG. 3. However, attached along a parallel fore/aft axis of roof 16, above the head of the driver (not seen) and the head 29 of the rear passenger (FIGS. 4 and 5) is a folded, generally flat, roof liner sheet 42. As illustrated in FIGS. 3 and 5, secured edge 45 of folded liner 42 is attached to the inner surface of roof 16. Attachment may be made using rivets 44, screws, or the like as shown in FIGS. 3, 5 and 11. Preferably, the liner 42 is attached along a single secured edge 45 so that, when needed, it can be unfolded and extended toward the left side of the vehicle for the protection of occupants on that side. A like liner (not shown) may also be attached to the right side of roof 16 for the protection of the right side passengers. Further description of the function of the roof liners of this invention will be in connection with the left side liner 42. It is understood, however, that the operation of a right side liner is essentially the mirror image of the storage and operation of liner 42.

Liner 42 is formed of a suitably pliable and strong fabric material, e.g., a 400 denier nylon fabric. As viewed in FIGS. 1, 3 and 4, liner 42 is in its folded arrangement for storage. The leading edge 50 (FIGS. 2 and 5) of stored liner 42 is under the folded package adjacent the left side of the vehicle. In its folded condition, liner 42 is stored against roof 16 above decorative headliner 52 and hidden from the view of vehicle occupants.

FIGS. 2 and 5 illustrate liner 42 in its drawn position so that the liner leading edge 50 extends well down the inner portion of the left side of the vehicle. Preferably the length of the liner is such that it can be pulled down adjacent the head and shoulders of both the front and rear passengers to the bottom of windows 36 and 40 (sometimes called the belt line of the vehicle). As shown in FIG. 2, the generally trapezoidal liner 42 has a grommet 54 at the front end of leading edge 50 and a similar grommet 56 at its rear end. These grommets 54, 56 permit cables, described in detail below, to be attached to the liner 42 for drawing of the liner 42 from its stored position to its occupant protecting position.

The reason for the trapezoidal shape of liner 42 is illustrated in FIG. 2. The liner is stored under roof 16 but the length of the roof is shorter than the length of the underlying passenger compartment. The trapezoidal shape permits the unfolded and drawn liner 42 to protect both front and rear seat passengers in a roll-over situation. The folded liner package is best illustrated in FIGS. 3, 4 and 11. FIG. 1 is intended to show the liner pulling system and shows the folded liner only as a line for simplicity of illustration.

The pulling or drawing of liner 42 from its stored position is accomplished by means of a piston/cylinder and cable/pulley arrangement illustrated in FIGS. 1 through 8. In a first embodiment of the invention, the piston/cylinder mechanism 60 is located in the B or middle pillar 30. In summary, the mechanism is actuated to draw two cables 62, 64 that are led over suitably located pulleys to attach to grommets 54 and 56 of the liner 42.

Figure 7:
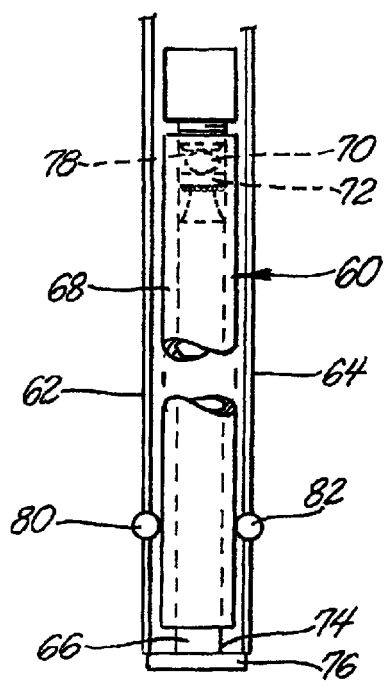
FIG. 7 is an elevation view of an isolated sheet pulling piston rod and cylinder tube for a roof liner assembly. The cylinder and position are shown in their stored position.

The piston/cylinder mechanism 60 is illustrated in detail in FIGS. 7 (stored position) and 8 (activated position). The mechanism 60 includes piston rod 66 within cylinder tube 68. At the upper end of cylinder 68 is attached an inflator device, whose output nozzle is at 70. This inflator 70 closes the upper end of cylinder tube 68 so as to form a closed pressurizable chamber 78 with the interior of the tube and the piston rod 66. The inflator 70 is electrically activated by a control system, not shown, in response to a sensor signal indicating a lateral impact or impending vehicle rollover sufficient to require occupant protection from liner 42. The inflator may be of a type suitable for inflating air bags or the like and has the capacity of rapidly generating a piston moving pressure of, e.g., 100 kPa, with sufficient moles of gas to displace and stroke piston rod 66.

In its stored or inactivated position, one end 72 of piston rod 66 lies within cylinder 68 close to inflator 70. The other end 74 of piston rod 66 extends beyond the open end of cylinder tube 68. Affixed to rod end 74 is an optional plate 76 to which one end of each of cables 62 and 64 are securely attached if not attached directly to the end of piston rod 66. The cables 62, 64 extend upwardly along cylinder tube 68 through cable guides 80 and 82 within the recess 96 in B pillar 30, FIG. 6. The further path of cables 62 and 64 is best seen in FIGS. 1–3.

Forward cable 62 leads from plate 76 on piston rod 74 upward within B pillar to pulley (or similar routing device) 84 at the side edge of roof 16. Cable 62 then leads forwardly along the roof edge to pulley 86 at the top of the A pillar 28. Cable 62 turns on pulley 86 and is led down the A pillar to a third pulley 88 where it is turned and led back up the A pillar to attach to the forward grommet 54 of liner 42. The rear cable likewise extends from plate 76 on the bottom of piston rod 66 at 74 up the B pillar 30 and is turned rearwardly along the roof and down the C pillar 32 of the vehicle by pulleys 90, 92, and 94. Rear cable 64 is led to the rear grommet 56 of liner 42.

The method of drawing liner 42 from its stored position is now readily understood. When the inflator is activated it generates a gas under high pressure (illustrated schematically in FIG. 8) that drives the piston rod 66 downwardly and out the end of tube 68. The stroke of rod 66 pulls the front 62 and rear 64 cables down to draw the folded liner 42 to its occupant protecting position illustrated in FIGS. 2 and 5.

Figure 8:
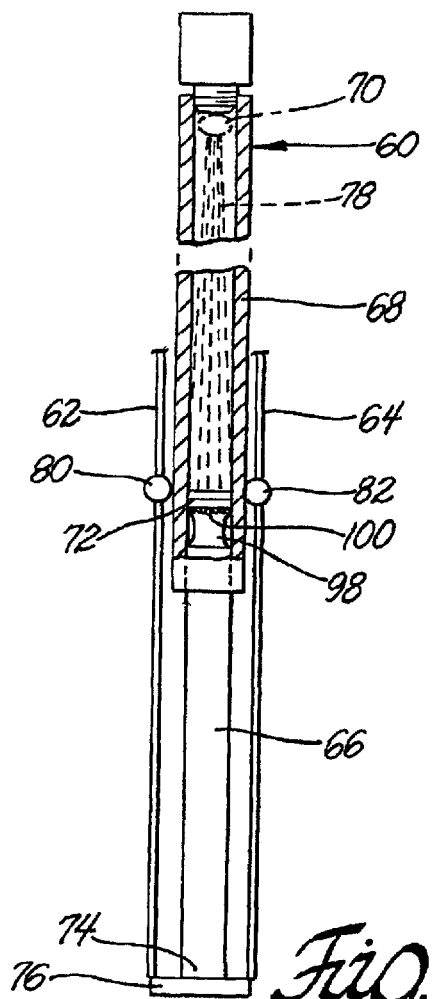
FIG. 8 is an elevation view like that of FIG. 7 showing the piston and cylinder partly in section and in their activated position.

The liner 42 is held in its in its occupant protecting position, by an anti-reverse stroke mechanism built into piston rod, similar to those used in pyrotechnic buckle pretensioners. This mechanism is shown in FIG. 8. The upper end of rod 66 has a machined annular ramp 98 that accommodates several metal balls 100. During the downward stroke of rod 66 the balls 100 roll freely within the space between ramp 98 and the inner surface of tube 68. Once the piston has completed its stroke any force exerted by an occupant on the liner 42 acts to pull the piston rod back into the cylinder tube 68 and reduce the cushioning effect of the liner. This motion is resisted because the balls 100 then are wedged between the ramp 98 and the tube 68 wall.

When such a liner 42 has been drawn to its operative position it provides isolation for the head of an occupant in side impacts of the vehicle with fixed poles and like collisions. In the event of a vehicle roll-over the drawn liner retains the head and torso of the occupant within the passenger compartment and reduces the likelihood of impact with the side or ejection from the vehicle. When a liner is provided on both sides of the compartment as is preferred, a tent-like occupant cushion structure is formed within the compartment.

Figure 9:
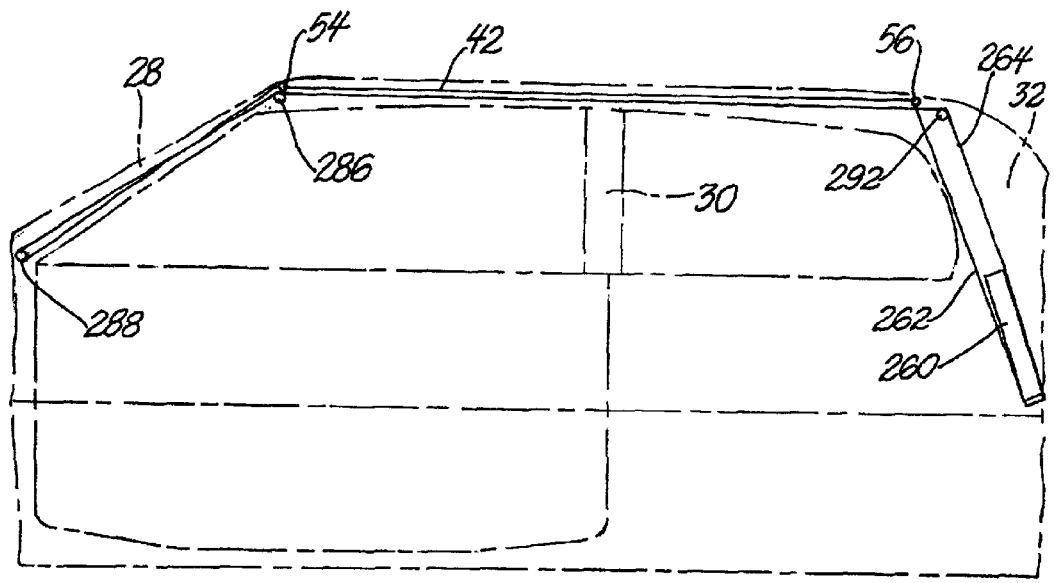
FIG. 9 is a side phantom view of the passenger compartment portion of a vehicle body showing a schematic view of a second embodiment of the piston/cylinder location and cable arrangement when the liner assembly is in its stored position.
Figure 10:
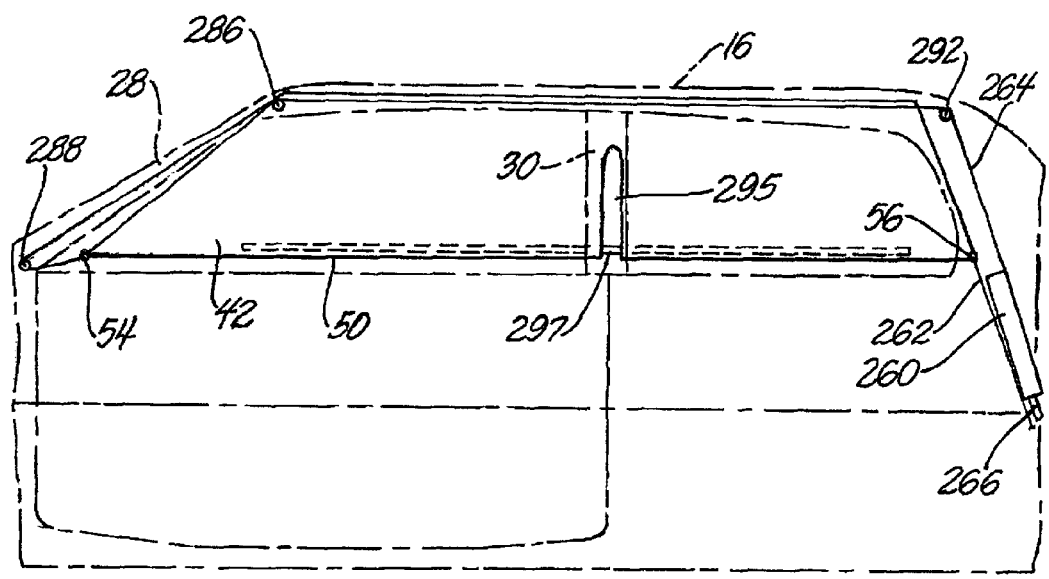
FIG. 10 is a side view like FIG. 9 showing the piston/cylinder and cable arrangement when roof liner is in its extended and operative position.

FIGS. 9, 10 and 11 illustrate a second embodiment of the invention. In this embodiment the piston/cylinder mechanism 260 is located either in the A pillar 28 or the C pillar 32. A "C" pillar 32 version is illustrated in FIGS. 9 and 10. An "A" pillar version is illustrated in FIG. 11. The main difference from the first embodiment is the cabling and pulley arrangement. The piston rod and cylinder tube may be of the same constriction and actuated in the same manner as in the first described embodiment of the invention.

Referring to FIGS. 9 and 10, the piston/cylinder mechanism 260 is suitably located in a recess (not shown) in the C pillar. Cable 262 attaches directly to the rear grommet 56 on liner 42. Cable 264 is led over pulley 292 at the C pillar and over pulleys 286 and 288 in the A pillar. After cable 264 is turned around pulley 288 it connects to the front grommet 54 of liner 42. Upon suitable actuation of the piston/cylinder mechanism 260 as described with mechanism 60, the piston rod is simply extended to pull cables 262 and 264 so that the vehicle liner 42 is drawn from its stored position (FIG. 9) into its occupant protecting position as illustrated in FIG. 10. For simplified illustration the cylinder 260 is not shown with its piston rod 266 fully extended in FIG. 10.

In FIG. 10, liner 42 is shown with an optional slot 295 to permit the liner 24 to be easily drawn past a seat belt anchored to the B pillar. In this view the leading edge 50 of liner 42 has a tab or folded portion 297 to stiffen the drawn liner for its protective function.

FIG. 11 is an isolated view of the piston/cylinder system and pulley/cable arrangement of this embodiment. It also shows a side view of a liner 42 in its folded storage condition. Because of the trapezoidal shape of the illustrated liner 42 the folded package is thicker at the fore and aft sides. The leading side portions of the liner to which cables 262 and 264 are attached (at grommets 54 and 56) are on the bottom of the folded package. As seen in the phantom lines of the unfolding liner, the drawing of the liner commences from the bottom of the folded package.

In FIG. 11, the liner withdrawal cylinder 260 is shown positioned for location in the A pillar to illustrate this embodiment. In this version of the second embodiment, cable 262 is directly connected to the front grommet 54 of liner 42. Cable 264 is led over pulley 286 in the A pillar and over pulleys 292 and 294 in the C pillar to rear grommet 56.

Figure 12:
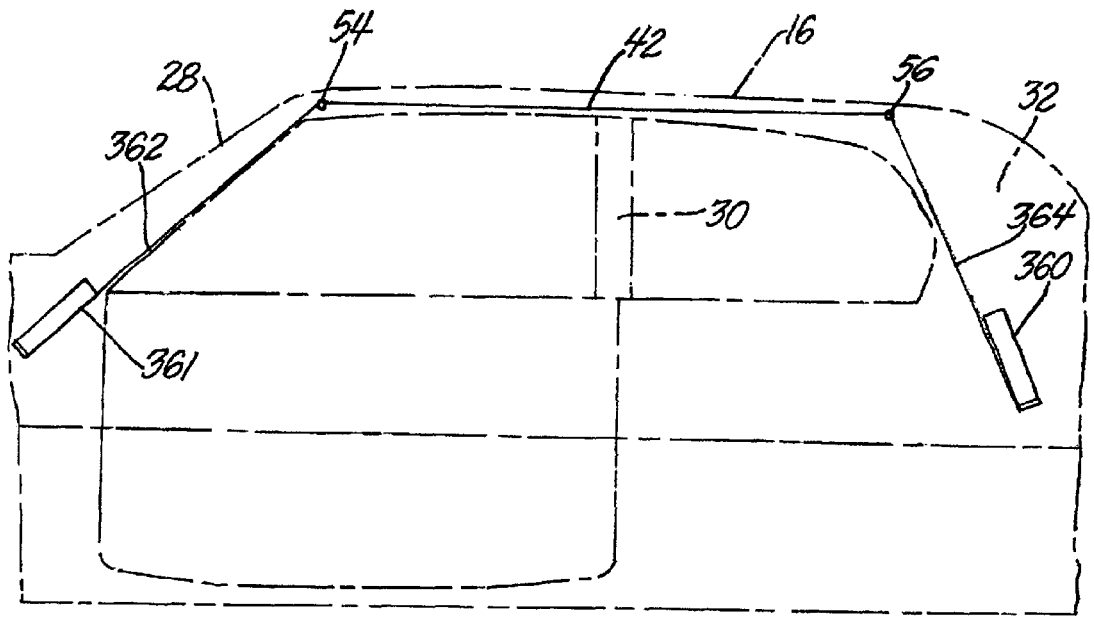
FIG. 12 is a side phantom outline view of the passenger compartment portion of a vehicle body showing a schematic view of the cable arrangement and cylinder/piston location in a third embodiment of the invention with the roof liner assembly in its stored position.
Figure 13:
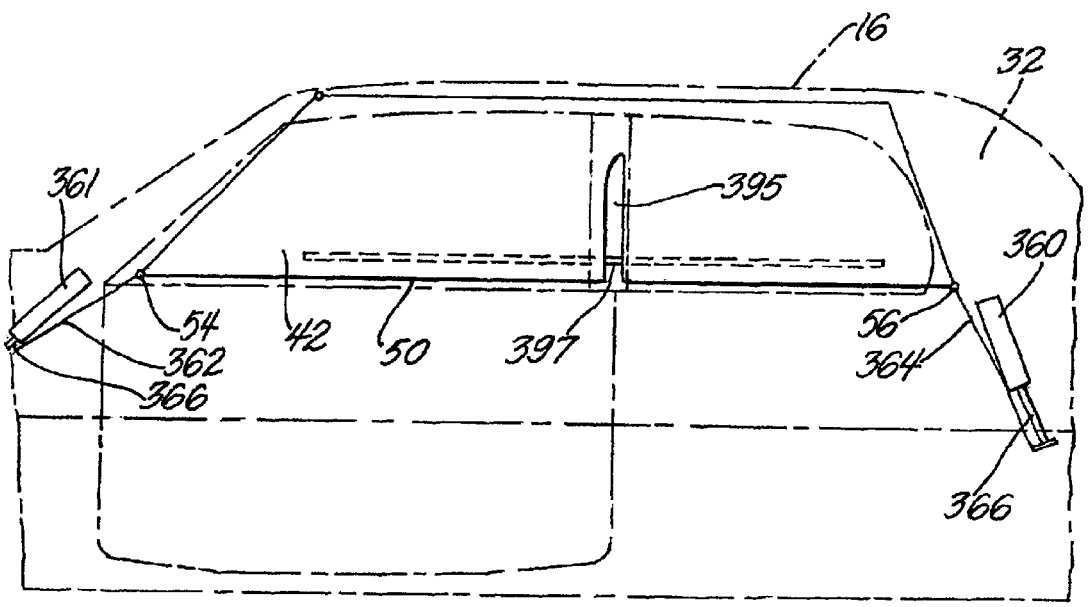
FIG. 13 is a side view like FIG. 12 showing the piston/cylinder and cable arrangement with the roof liner in its extended and operative position.

FIGS. 12 and 13 show a third embodiment of the invention. Two piston/cylinder mechanisms are employed, one mechanism 361 with piston rod 366 in the A pillar, one mechanism 360 with its piston rod 366 in the C pillar. Each piston/cylinder mechanism 360, 361 requires only one cable. In each case, two relatively short cables, 362 in the front and 364 in the back, connect directly to liner grommets 54 and 56, respectively. Although this embodiment requires a two-piston cylinder mechanisms there is less cabling involved and no pulleys involved in the drawing of the roof liner into its occupant cushioning. Liner 42 is shown with slot 395 and tab 397 corresponding to the like parts of liner 42 described in connection with the second embodiment and referring to FIG. 10. FIG. 12 shows grommets 54 and 56 in their stored position and FIG. 13 shows the grommets 54, 56 and leading edge 50 in their extended position.

Thus, a few different embodiments have been illustrated of a useful vehicle occupant device. Obviously, other arrangements could readily be adapted by those skilled in the art. Accordingly, the scope of the invention is to be considered limited only by the following claims.

What is claimed is:

1. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one flexible sheet member having first and second opposing edges, said second edge having a greater length than said first edge, said sheet member being attached at said first edge to the interior surface of said roof, said sheet being folded between its first and second edges and extending from said attached first edge toward one side roof portion and the side compartment portion for storage against the interior surface of said roof, and sheet pulling means attached to at least one body pillar on said side compartment portion and attached to respective front and rear ends of said second opposing edge of said sheet member for pulling and unfolding said sheet from a stored position against the interior surface of said roof and to draw said sheet in a direction toward said side compartment portion and downwardly within said occupant compartment to an occupant cushioning position wherein the sheet in an unfolded state cushions an occupant on said side of said occupant compartment from impact with said vehicle body, said means being activated for pulling said sheet upon a predetermined lateral acceleration of said vehicle body.

2. An automotive vehicle body as recited in claim 1 in which said sheet pulling means comprises:

a cylinder containing a piston rod, said cylinder having an open end, said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second edge of said sheet, and means associated with said cylinder for moving said rod in a stroke through the open end of said cylinder to pull said sheet to its occupant cushioning position.

3. An automotive vehicle body as recited in claim 1 in which said occupant compartment comprises front and rear occupant seats on said side compartment portion in a fore-aft occupant location and a spacing, and the length and a location of said second edge of said flexible sheet member permitting cushioning of both front and rear occupants in said fore-aft occupant location in the occupant cushioning position of said sheet.

4. An automotive vehicle body as recited in claim 2 in which said occupant compartment comprises front and rear occupant sears on said side compartment portion in a fore-aft occupant location and spacing, and the length and a location of said second edge of said flexible sheet member permitting cushioning of both front and rear occupants in said fore-aft occupant location in the occupant cushioning position of said sheet.

5. An automotive vehicle body as recited in claim 1 in which said sheet pulling means is attached to the side body pillar on said side compartment portion.

6. An automotive vehicle body as recited in claim 2 in which said sheet pulling means is attached to the side body pillar on said side compartment portion.

7. An automotive vehicle body as recited in claim 3 in which said sheet pulling means is attached to the side body pillar on said side compartment portion.

8. An automotive vehicle body as recited in claim 1 in which said sheet puling means is attached to the rear body pillar on said side compartment portion.

9. An automotive vehicle body as recited in claim 2 in which said sheet pulling means is attached to the rear body pillar on said side compartment portion.

10. An automotive vehicle body as recited in claim 3 in which said sheet pulling means is attached to the rear body pillar on said side compartment portion.

11. An automotive vehicle body as recited in claim 1 in which said sheet pulling means are attached to both the front and rear body pillars on said side compartment portion.

12. An automotive vehicle body as recited in claim 2 in which said sheet pulling means are attached to both the front and rear body pillars on said side compartment portion.

13. An automotive vehicle body as recited in claim 3 in which said sheet pulling means are attached to both the front and rear body pillars on said side compartment portion.

14. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges, said sheet member being attached at said first edge to the interior surface of said roof, said sheet being folded between its first and second edges and extending from said attached first edge toward one side roof portion and the side compartment portion for storage against the interior surface of said roof;

sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in unfolded state cushions an occupant on said side of said occupant compartment from impact with said vehicle body, said means being activated for pulling said sheet upon a predetermined lateral acceleration of said vehicle body in which said sheet pulling means comprises:

a cylinder containing a piston rod, said cylinder having an open end;

said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet; and means associated with said cylinder for moving said rod in a stroke through the open end of said cylinder to pull said sheet to its occupant cushioning position and in which said sheet pulling means is attached to the side body pillar on said side compartment portion and said sheet pulling means comprises two cables attached to said piston rod and with one cable attached to one end of said second sheet edge and the second cable attached to the other end of said second sheet edge.

15. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges, said sheet member being attached at said first edge to the interior surface of said roof, said sheet being folded between its first and second edges and extending from said attached first edge toward one side roof portion and the side compartment portion for storage against the interior surface of said roof, and sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in an unfolded state cushions an occupant on said side of said occupant compartment from impact with said vehicle body, said means being activated for pulling said sheet upon a predetermined lateral acceleration of said vehicle body, and in which said sheet pulling means comprises:

a cylinder containing a piston rod, said cylinder having an open end, said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet, and means associated with said cylinder for moving said rod in a stroke through the open end of said cylinder to pull said sheet to its occupant cushioning position, and in which said occupant compartment comprises front and rear occupant seats on said side compartment portion in a fore-aft occupant location and spacing, and a length and location of said second edge of said flexible sheet member permitting cushioning of both front and rear occupants in said fore-aft occupant location in the occupant cushioning position of said sheet, and in which said sheet pulling means is attached to the side body pillar on said side compartment portion and said sheet pulling means comprises two cables attached to said piston rod and with one cable attached to one end of said second sheet edge and the second cable attached to the other end of said second sheet edge.

16. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges, said sheet member being attached at said first edge to the interior surface of said roof, said sheet being folded between its first and second edges and extending from said attached first edge toward one side roof portion and the side compartment portion for storage against the interior surface of said roof;

sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in an unfolded state cushions an occupant on said side of said occupant compartment from impact with said vehicle body, said means being activated for pulling said sheet upon a predetermined lateral acceleration of said vehicle body and in which said sheet pulling means comprises:

a cylinder containing a piston rod, said cylinder having an open end;

said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet; and means associated with said cylinder for moving said rod in a stroke through the open end of said cylinder to pull said sheet to its occupant cushioning position and in which said sheet pulling means is attached to the rear body pillar on said side compartment portion and said sheet pulling means comprises two cables attached to said piston rod and with one cable attached to one end of said second sheet edge and the second cable attached to the other end of said second sheet edge.

17. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges edge, said sheet member being attached at said first edge to the interior surface of said roof, said sheet being folded between its first and second edges and extending from said attached first edge toward one side roof portion and the side compartment portion for storage against the interior surface of said roof, and sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in an unfolded state cushions an occupant on said side of said occupant compartment from impact with said vehicle body, said means being activated for pulling said sheet upon a predetermined lateral acceleration of said vehicle body, and in which said sheet pulling means comprises:

a cylinder containing a piston rod, said cylinder having an open end, said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet, and means associated with said cylinder for moving said rod in a stroke through the open end of said cylinder to pull said sheet to its occupant cushioning position, and in which said occupant compartment comprises front and rear occupant seats on said side compartment portion in a fore-aft occupant location and spacing, and a length and location of said second edge of said flexible sheet member permitting cushioning of both front and rear occupants in said fore-aft occupant location in the occupant cushioning position of said sheet, and in which said sheet pulling means is attached to the rear body pillar on said side compartment portion and said sheet pulling means comprises two cables attached to said piston rod and with one cable attached to one end of said second sheer edge and the second cable attached to the other end of said second sheet edge.

18. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges, said sheet member being attached at said first edge to the interior surface of said roof, said sheet being folded between its first and second edges and extending from said attached first edge toward one side roof portion and the side compartment portion for storage against the interior surface of said roof;

sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in an unfolded state cushions an occupant on said side of said occupant compartment from impact with said vehicle body, said means being activated for pulling said sheet upon a predetermined lateral acceleration of said vehicle body, and in which said sheet pulling means comprises:

a cylinder containing a piston rod, said cylinder having an open end;

said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet; and means associated with said cylinder for moving said rod in a stroke through the open end of said cylinder to pull said sheet to its occupant cushioning position and in which said sheet pulling means are attached to both the front and rear body pillars on said side compartment portion and each said sheet pulling means comprises one cable attached to each said piston rod and with one cable attached to one end of said second sheet edge and the second cable attached to the other end of said second sheet edge.

19. An automotive vehicle body with occupant cushioning against side impacts and vehicle roll-over, said body comprising:

an occupant compartment having front, rear and side compartment portions with respect to the forward direction of motion of the vehicle, said compartment being covered by a body roof;

said roof having front, rear and side roof portions and a central fore-aft axis, said roof having an interior surface defining the top of said occupant compartment;

said roof being fixed on two front body pillars at the corners of said front and side roof portions, two rear body pillars at the corners of said rear and side roof portions and two side body pillars at said roof side portions;

at least one non-inflatable flexible sheet member having first and second opposing edges, said sheet member being attached at said first edge to the interior surface of said roof, said sheet being folded between its first and second edges and extending from said attached first edge toward one side roof portion and the side compartment portion for storage against the interior surface of said roof, and sheet pulling means attached to at least one body pillar on said side compartment portion for pulling and unfolding said sheet from a stored position against the interior surface of said roof and to draw said sheet in a direction toward said side compartment portion and downwardly within said occupant compartment to an occupant cushioning position wherein the flat sheet in an unfolded state cushions an occupant on said aide of said occupant compartment from impact with said vehicle body, said means being activated for pulling said sheet upon a predetermined lateral acceleration of said vehicle body, and in which said sheet pulling means comprises:

a cylinder containing a piston rod, said cylinder having an open end, said piston rod having a sheet pulling end extending through the open end of said cylinder, and said rod being movable in said cylinder from its stored position, prior to activation of said sheet pulling means, through the open end of said cylinder for pulling said sheet to its occupant cushioning position, said rod having at least one cable attached to its sheet pulling end, the other end of said cable being attached to said second end of said sheet, and means associated with said cylinder for moving said rod in a stroke through the open end of said cylinder to pull said sheet to its occupant cushioning position, and in which said occupant compartment comprises front and rear occupant seats on said side compartment portion in a fore-aft occupant location and spacing, and a length and location of said second edge of said flexible sheet member permitting cushioning of both front and rear occupants in said fore-aft occupant location in the occupant cushioning position of said sheet, and in which said sheet pulling means are attached to both the front and rear body pillars on said side compartment portion and each said sheet pulling means comprises one cable attached to each said piston rod and with one cable attached to one end of said second sheet edge and the second cable attached to the other end of said second sheet edge.

* * * * *